US009547226B2

(12) United States Patent
Kimura et al.

(10) Patent No.: US 9,547,226 B2
(45) Date of Patent: Jan. 17, 2017

(54) LIGHT SOURCE DEVICE AND PROJECTION-TYPE IMAGE DISPLAY DEVICE

(71) Applicant: HITACHI MAXELL, LTD., Osaka (JP)

(72) Inventors: Nobuyuki Kimura, Ibaraki (JP); Kohei Miyoshi, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/439,931

(22) PCT Filed: Nov. 1, 2012

(86) PCT No.: PCT/JP2012/078280
§ 371 (c)(1),
(2) Date: Apr. 30, 2015

(87) PCT Pub. No.: WO2014/068742
PCT Pub. Date: May 8, 2014

(65) Prior Publication Data
US 2015/0293432 A1 Oct. 15, 2015

(51) Int. Cl.
G03B 21/20 (2006.01)
G02B 6/42 (2006.01)
F21V 8/00 (2006.01)

(52) U.S. Cl.
CPC .......... *G03B 21/208* (2013.01); *G03B 21/204* (2013.01); *G02B 6/0008* (2013.01); *G02B 6/425* (2013.01);
(Continued)

(58) Field of Classification Search
CPC ............. G03B 21/20; G02B 6/00; G02B 6/42; F21S 2/00
See application file for complete search history.

(56) References Cited

U.S. PATENT DOCUMENTS

2010/0328628 A1* 12/2010 Masuda ............... G02B 26/008
353/85
2010/0328632 A1 12/2010 Kurosaki et al.
(Continued)

FOREIGN PATENT DOCUMENTS

JP 2011-013313 A 1/2011
JP 2011-243369 A 12/2011
(Continued)

Primary Examiner — Sultan Chowdhury
Assistant Examiner — Danell L Owens
(74) Attorney, Agent, or Firm — Volpe and Koenig, P.C.

(57) ABSTRACT

To provide a light source device and a projection-type image display device which can improve light emitting efficiency and service life of a fluorescent material. The light source device includes: an excitation light source for emitting excitation light; a fluorescent material for emitting fluorescent light when excited by the excitation light; and an optical member for directing the excitation light to the fluorescent material. The optical member has a curvature that is set such that a light-condensing position of the excitation light is positioned on a light-emitting side of the excitation light relative to the fluorescent material. An optical fiber is disposed between the excitation light source and the light source, so that the excitation light from the excitation light source may be made incident on the optical fiber.

12 Claims, 6 Drawing Sheets

(52) U.S. Cl.
CPC ......... *G02B 6/4298* (2013.01); *G03B 21/2013* (2013.01); *G03B 21/2066* (2013.01)

(56) References Cited

U.S. PATENT DOCUMENTS

| | | | | |
|---|---|---|---|---|
| 2011/0128505 A1* | 6/2011 | Okamoto | ............. | G02B 27/102 |
| | | | | 353/31 |
| 2011/0280032 A1 | 11/2011 | Kishimoto | | |
| 2013/0088471 A1* | 4/2013 | Kitano | ................. | H04N 9/3114 |
| | | | | 345/208 |
| 2013/0222772 A1 | 8/2013 | Matsubara | | |

FOREIGN PATENT DOCUMENTS

| | | |
|---|---|---|
| JP | 2012-123948 A | 6/2012 |
| WO | 2012/066654 A1 | 5/2012 |

\* cited by examiner (A)

(B)

(C)

(A)

(B)

(C)

(A)

(B)

(A)

(B)

(A)

(B)

(C)

LIGHT SOURCE DEVICE AND PROJECTION-TYPE IMAGE DISPLAY DEVICE

TECHNICAL FIELD

The present invention relates to a light source device and a projection-type image display device.

BACKGROUND ART

In a projection-type image display device that displays a display screen of an image display element on a projection surface in an enlarged manner, its illumination optical system has been devised so as to obtain an enlarged image with sufficient size and brightness on the projection surface. In particular, a projection-type image display device using solid light-emitting elements, such as red, green and blue light-emitting diodes, organic ELs or the like, has been developed.

For example, a light source device that emits excitation light emitted from a solid light source as visible light with high efficiency has been proposed (see Patent Document 1).

RELATED ART DOCUMENT

Patent Document

Patent Document 1: Japanese Laid-Open Patent Publication No. 2011-13313

SUMMARY OF THE INVENTION

Problems to be Solved by the Invention

In Patent Document 1, a problem arises in which since the excitation light is irradiated onto a fluorescent material in a manner so as to be concentrated onto a single portion, the fluorescent material deteriorates in its light-emitting efficiency and causes a shortened service life.

Therefore, the object of the present invention is to provide a light source device and a projection-type image display device that improve the light-emitting efficiency and service life of the fluorescent material.

Means for Solving the Problems

In order to solve the above-mentioned problems one of desirable aspects of the present invention is as follows. The light source device includes: a fluorescent material for emitting fluorescent light when excited by the excitation light; and an optical member for directing the excitation light to the fluorescent material. The optical member has a curvature that is set so as to allow the excitation light that has passed through the optical member to be made incident on the fluorescent material at a front side of the fluorescent material as a light-condensing position.

Effects of the Invention

According to the present invention, a light source device and a projection-type image display device that improve the light-emitting efficiency and service life of the fluorescent material can be provided.

BRIEF DESCRIPTIONS OF THE DRAWINGS

DETAILED DESCRIPTION OF PREFERRED EMBODIMENTS

Figure 1:
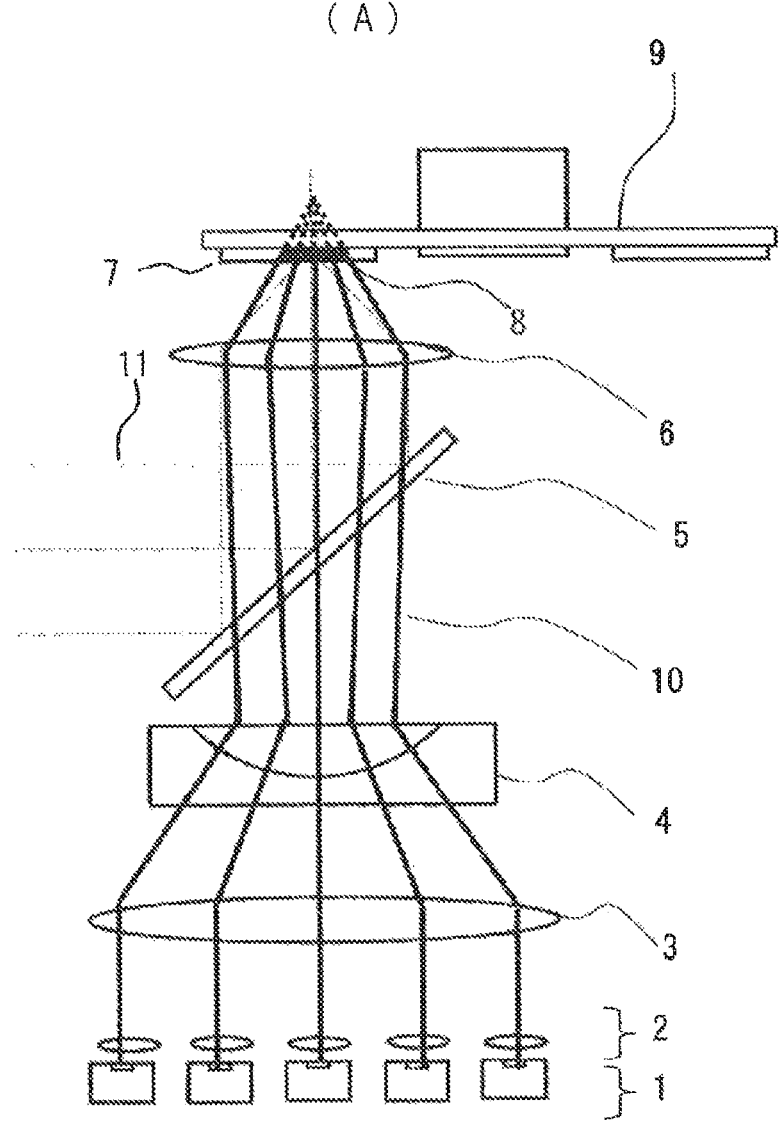
FIG. 1 is a block diagram showing main parts of alight source device in accordance with a first embodiment.
Figure 1:
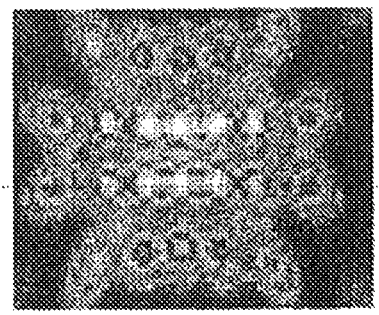
Figure 1:
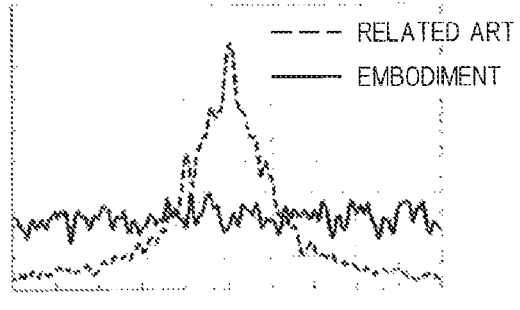

Hereinafter, embodiments will be described with reference to the accompanying drawings. In each drawing, the same components as those in the foregoing drawings are assigned the same reference numerals, and description of already-described components will be omitted. Additionally, in the present specification, a light source of a group of excitation light sources 1 is explained as a laser having a small light-emitting area. The luminance distribution of the corresponding laser has a distribution in which the center portion is bright, with a peripheral portion being dark.

Figure 6:
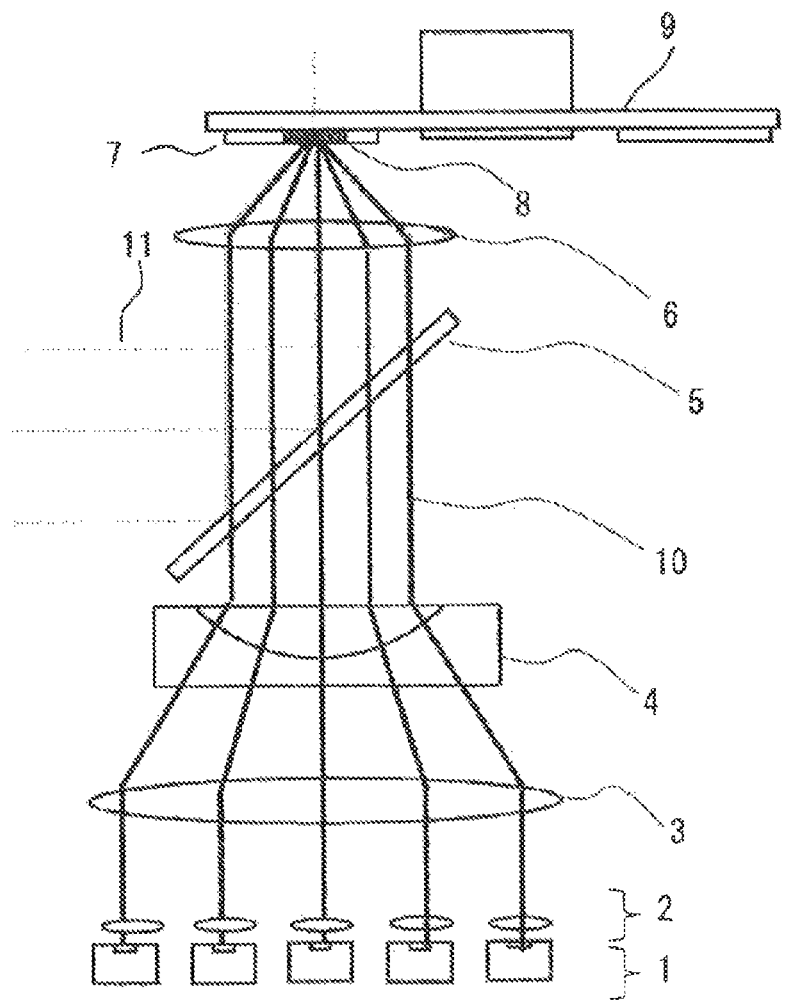
FIG. 6 is a block diagram showing main parts of a light source device that is presumed to have a problem.
Figure 6:
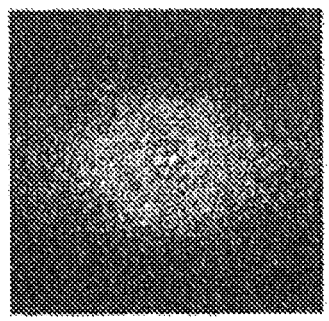
Figure 6:
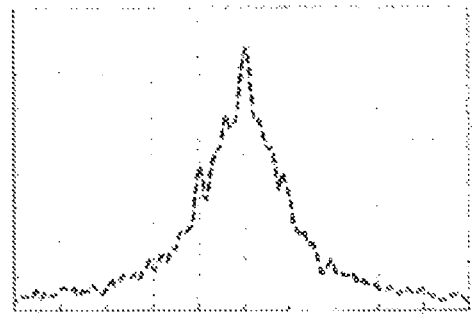

First, problems with the present invention will be explained. FIG. 6 is a block diagram showing main parts of the light source device that is presumed to have problems.

In FIG. 6(A), excitation light 10 emitted from the group of excitation light sources 1 is formed into substantially parallel light rays by a collimate lens 2, and passes through a convex lens 3 and a concave lens 4, and is then made incident on a dichroic mirror 5, with its width of light fluxes being narrowed. The dichroic mirror 5 has such characteristics as to allow the wavelength range of the excitation light 10 to pass therethrough, with the wavelength range of fluorescent light 11 being reflected. Therefore, the excitation light 10 passes through the dichroic mirror 5, and after passing through a condenser lens 6, is made incident on a disc 9 that is coated with a fluorescent material 7 and capable of being rotation-controlled.

The condenser lens 6 has its curvature set so that incident parallel light rays are condensed on an irradiation region 8 on the disc 9. That is, the light-emitting luminance distribution of the group of excitation light sources 1 is expanded on the fluorescent material 7 through a group of a plurality of lens to be irradiated onto the irradiation region 8. The fluorescent material 7 excited by the excitation light 10 emits fluorescent light 11. After passing through the condenser lens 6, the fluorescent light 11 is formed into substantially parallel light rays, and reflected by the dichroic mirror 5 and made incident on an illumination optical system on a later stage.

FIG. 6(B) and FIG. 6(C) show the irradiation region 8 of the excitation light 10 on the fluorescent material 7, FIG. 6(B) is a two-dimensional distribution drawing of excitation light, and FIG. 6(C) shows a luminance distribution on one cross-section. The excitation light 10 irradiated onto the fluorescent material 7 forms a distribution like a laser luminance distribution in which the center portion is bright, with a peripheral portion being dark. When the fluorescent material absorbs the excitation light to emit fluorescent light, it generates heat corresponding to a difference between wavelengths (energy) of the excitation light and fluorescent light. Therefore, when the luminance in the center is high in the irradiation region 8, the temperature in the center becomes extremely high to cause a reduction in the light-emitting efficiency and a reduction in the service life of the fluorescent material.

When the luminance distribution of the excitation light to be irradiated onto the fluorescent material is made larger so as to lower the temperature of the fluorescent material, the efficiency in an illumination optical system at the later stage is lowered. This is caused by the fact that an illumination etendue is preserved (which will be described later in detail).

Additionally, an arrangement is proposed in which by shifting the disc 9 itself to the incident direction of the excitation light 10, the excitation light 10 is irradiated thereon before it is made incident on a single portion of the fluorescent material 7, so that the excitation light 10 is prevented from being condensed onto the single portion on the fluorescent material 7. However, a configuration is generally used in which the condenser lens 6 and the fluorescent material 7 are disposed, with a distance between them being made as short as possible to the minimum so as to capture the fluorescent light 11 emitted from the fluorescent material 7. Therefore, actually, it is not possible to dispose the fluorescent material 7 further closer to the condenser lens 6.

Moreover, another arrangement is also proposed in which by shifting the disc 9 itself to an emission direction of the excitation light 10, the excitation light 10 is irradiated onto the fluorescent material 7 when the irradiation region is expanded after being condensed onto a single portion, prior to being made incident on the fluorescent material 7, so that the excitation light 10 is prevented from being condensed on the single portion on the fluorescent material 7. However, when the distance between the fluorescent material 7 and the condensing lens 6 becomes longer, it becomes impossible to capture the fluorescent light 11 emitted from the fluorescent material 7 by using the condenser lens 6.

First Embodiment

FIG. 1 is a block diagram showing main parts of alight source device in accordance with a first embodiment. A main difference between FIG. 1(A) and FIG. 6(A) lies in that by devising the convex lens 3 and the concave lens 4, or the positions and curvature radiuses of the two lenses, the excitation light 10 is made incident on the condenser lens 6 in a manner so as to be diffused. Thus, the excitation light 10 that has passed through the condenser lens 6 is made incident on the fluorescent material 7 at the front side of the fluorescent material 7 as a light-condensing position (such that the light-condensing position is positioned on the emission side of the excitation light 10 relative to the fluorescent material 7). More specifically, it is proposed that the following adjustments are carried out: the curvature of the convex lens 3 is weakened or the curvature of the concave lens 4 is strengthened so as to make the excitation light 10 incident on the condenser lens 6 in a manner so as to be diffused, that is, the position of the convex lens 3 is made closer to the concave lens 4 side by about several mms, or the position of the convex lens 4 is made closer to the convex lens 3 side by about several mms.

FIG. 1(B) and FIG. 1(C) show an irradiation region 8 of the excitation light 10 on the fluorescent material 7, FIG. 1(B) is a two-dimensional distribution drawing of excitation light, and FIG. 1(C) shows a luminance distribution on one cross-section. In this case, in the irradiation region 8, a plurality of excitation light rays are irradiated not onto one portion, but onto positions that are substantially scattered evenly, thereby consequently forming a substantially uniform luminance distribution slightly defocused. Therefore, the temperature rise in the center of the irradiation region 8 can be prevented, so that the light-emitting efficiency and service life of the fluorescent material can be improved.

Additionally, the above explanations have been given supposing that the convex lens 3 and the concave lens 4, or the positions and curvature radiuses of the two lenses are devised; however, in order to make the excitation light 10 that has passed through the condenser lens 6 incident on the fluorescent material 7 at the front side of the fluorescent material 7 as the light-condensing position, any one of optical members of the lens system disposed between the group of excitation light sources 1 and the fluorescent material 7, that is, the convex lens 3, the concave lens 4 and the condenser lens 6, or the lens position or the curvature radius of combinations thereof, may be devised. For example, the curvature of the condenser lens 6 may be weakened. However, in this case, since the fluorescent light 11 is not made into parallel light rays, but made into a manner so as to be diffused, by the condenser lens 6, one more lens is required for making the fluorescent light 11 into parallel light rays, after having been reflected by the dichroic mirror 5.

Second Embodiment

Figure 2:
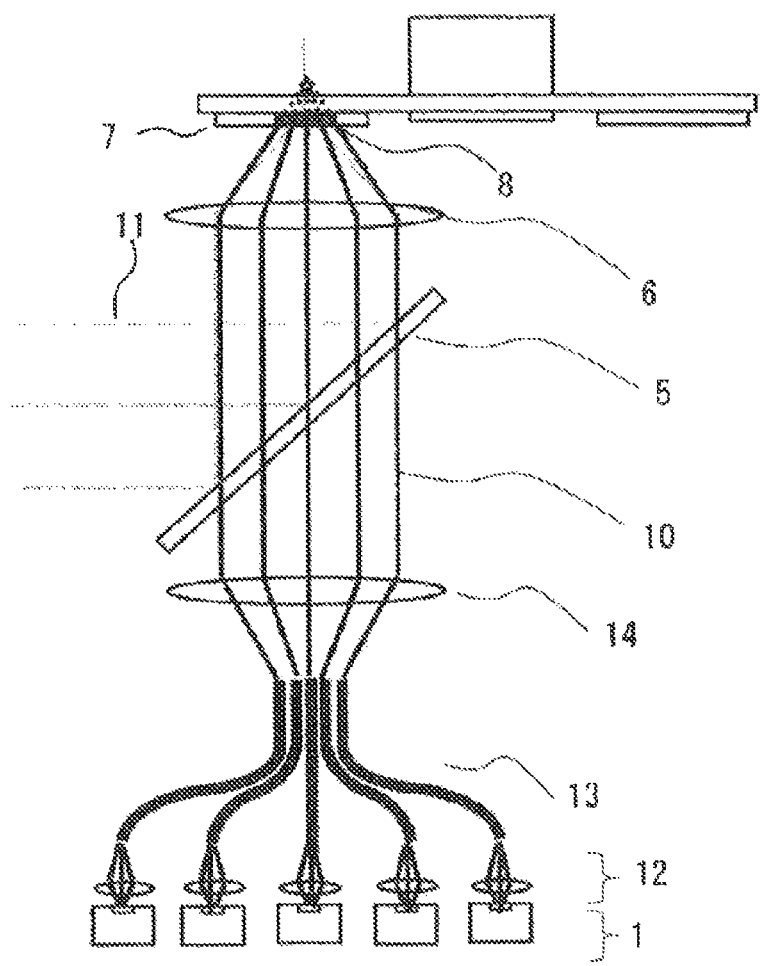
FIG. 2 is a block diagram showing main parts of alight source device in accordance with a second embodiment.
Figure 2:
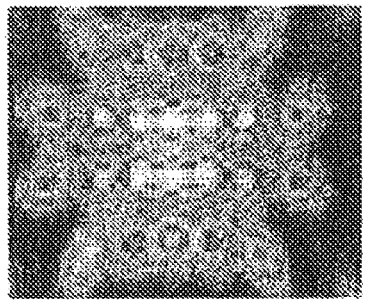
Figure 2:
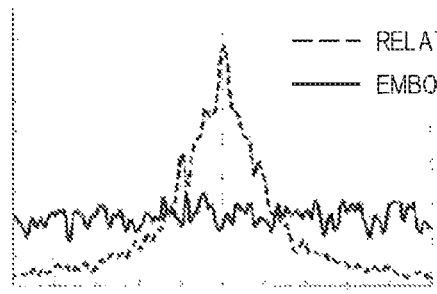

FIG. 2 is a block diagram showing main parts of alight source device in accordance with a second embodiment. A main difference between FIG. 2(A) and FIG. 1(A) lies in that the excitation light 10 emitted from each of the group of excitation light sources 1 is made incident on each of a group of optical fibers 13 by a condenser lens 12. The emission surfaces of the group of optical fibers 13 are bundled into one portion. The light emission luminance distribution of the emission surfaces of the group of optical fibers 13 is expanded onto the fluorescent material 7 through a group of a plurality of lens, and irradiated onto the irradiation region 8. Since the light emission luminance distribution of the emission surfaces of the group of optical fibers 13 has a substantially uniform distribution, the luminance distribution of the irradiation region 8 is also substantially uniform. That is, it is not necessary to carry out a defocusing process by using a lens as in the case of the first embodiment.

Additionally, as long as the luminance distribution of the irradiation region 8 can be made substantially uniform, it is only necessary for the emission surfaces of at least two or more optical fibers of the group of optical fibers 13 to be bundled into one or more portions.

FIGS. 2(B) and 2(C) show the irradiation region 8 of the excitation light 10 on the fluorescent material 7, FIG. 2(B) is a distribution drawing that shows a two-dimensional excitation light, and FIG. 2(C) shows a luminance distribution on one cross-section. In the same manner as in FIG. 1, this configuration also makes it possible to prevent the center of the irradiation region 8 from having a temperature rise, and consequently to improve the light emitting efficiency and service life of the fluorescent material.

Third Embodiment

Figure 3:
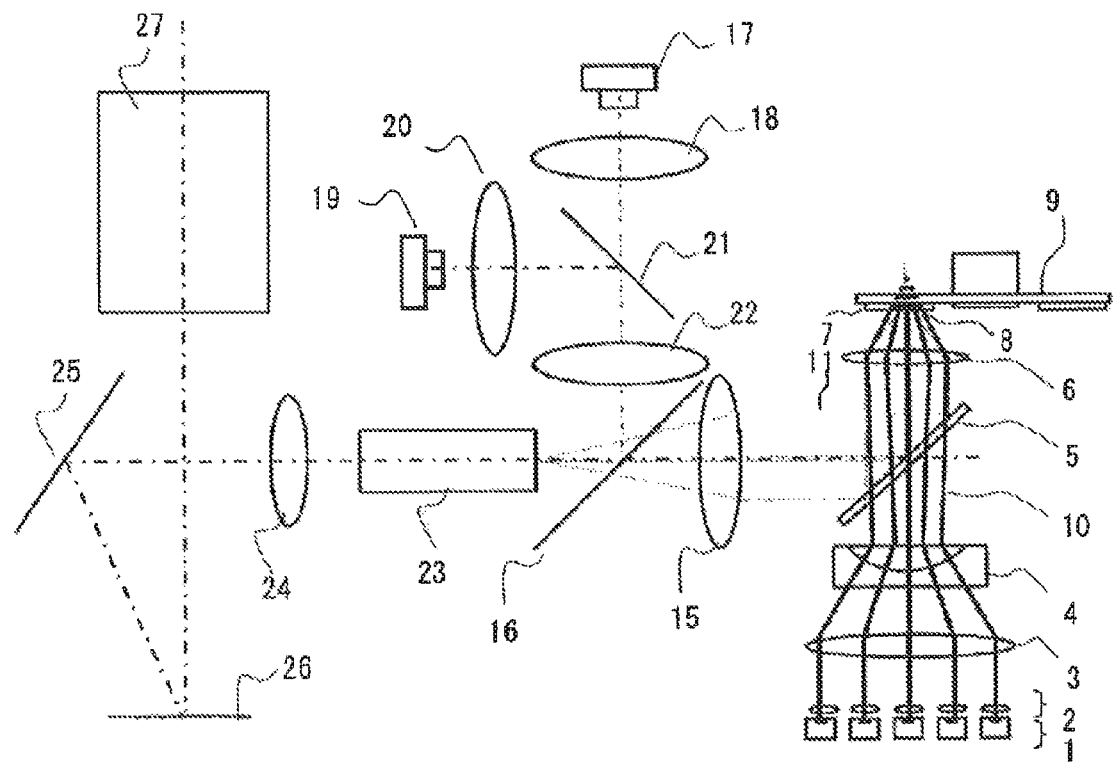
FIG. 3 is a diagram showing an optical system of a projection-type image display device that uses the light source device of the first embodiment.
Figure 3:
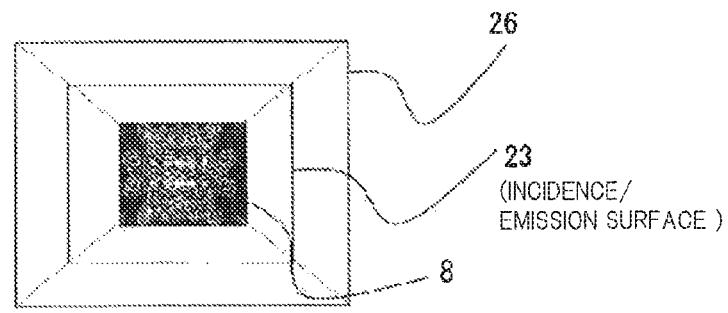

Next, an optical system of a projection-type image display device will be described. FIG. 3 is a diagram showing a configuration of the projection-type image display device using the light source device of the first embodiment.

FIG. 3(A) is a block diagram schematically showing an optical system of the projection-type image display device including the light source device of FIG. 1. In this case, suppose that the group of excitation light sources 1 emits blue excitation light 10 and the fluorescent material 7 is a green fluorescent material. At this time, the dichroic mirror 5 has such characteristics as to pass blue light therethrough, and reflect green light. After having passed through the condenser lens 6, the green light forms substantially parallel light rays and is reflected by the dichroic mirror 5, and after having passed through the condenser lens 15, is made incident on a dichroic mirror 16.

The dichroic mirror 16 has such characteristics as to pass green light therethrough, and reflect red light and blue light. Therefore, the green light passes through the dichroic mirror 16 and made incident on a multiplex reflection element 23. The condenser lens 15 is designed to have such a curvature as to condense light onto an incident opening portion of the multiplex reflection element 23, and on the incident opening surface of the multiplex reflection element 23, a shape that is analogous to the irradiation shape of the irradiation region 8 of the blue excitation light is formed.

A light source 17 is a red light source made of an LED. Red light emitted from the light source 17 is made into parallel light rays by a collimate lens 18, which are made incident on a dichroic mirror 21. The dichroic mirror 21 has such characteristics as to pass red light therethrough, and reflect blue light. Therefore, the red light passes through the dichroic mirror 21, and further passes through the condenser lens 22, and is then made incident on the dichroic mirror 16.

On the other hand, a light source 19 is a blue light source made of an LED. Blue light emitted from the light source 19 is formed into parallel light rays by the collimate lens 20, and made incident on the dichroic mirror 21. The blue light is reflected by the dichroic mirror 21, and passes through the condenser lens 22, and then made incident on the dichroic mirror 16.

The dichroic mirror 16 has such characteristics as to pass green light and reflect red light and blue light therethrough. Therefore, red light and blue light that are made incident on the dichroic mirror 16 are reflected by the dichroic mirror 16, and then made incident on the multiplex reflection element 23.

The condenser lens 22 is designed to have such a curvature as to condense light onto an incident opening portion of the multiplex reflection element 23, and on the incident opening surface of the multiplex reflection element 23, a shape analogous to the light emission shape of the light source 17 and the light source 19 is formed. Additionally, the characteristics of the dichroic mirror 21 may be altered so as to change the layout positions of the light source 17 and the light source 19.

Red light, green light and blue light, which are made incident on the multiplex reflection element 23, are reflected by the multiplex reflection element 23 a plurality of times to form light having a uniform luminance distribution on the emission opening surface of the multiplex reflection element 23. The shape of the emission opening surface of the multiplex reflection element 23 is formed into a shape substantially analogous to an image display element 26. The condenser lens 24 is set to have such a curvature as to enlarge an image, which is formed on the emission opening surface of the multiplex reflection element 23, to be formed as an image on the image display element 26. Therefore, red light, green light and blue light, which have been emitted from the emission opening surface of the multiplex reflection element 23, pass through the condenser lens 24, and after having been reflected by the reflection mirror 25, are irradiated onto the image display element 26 with a uniform illumination distribution.

The group of excitation light sources 1, the light source 17 and the light source 19 are solid-state light-emitting elements having a fast response speed, and can be controlled in a time-shared manner. Therefore, the light rays with the respective colors are modulated for each of the light rays with the respective colors in a time-shared manner by the image display element 26. The light rays with the respective colors, reflected by the image display elements 26, are made incident on a projection lens 27, and projected onto a screen, not shown.

FIG. 3(B) shows the irradiation region 8 on the fluorescent material 7, the shape of the incidence/emission opening of the multiplex reflection element 23 and the effective region of the image display element 26. Since the shape of the emission opening of the multiplex reflection element 23 is expanded and projected onto the image display element 26, the shape of the emission opening of the multiplex reflection element 23 is substantially analogous to the effective region of the image display element 26. Since the shape of the incident opening of the multiplex reflection element 23 is generally made the same as that of the emission opening thereof, the shape of the incident opening of the multiplex reflection element 23 is also made analogous to the effective region of the image display element 26. Moreover, as described earlier, as the shape of the incident opening of the multiplex reflection element 23, the light emission luminance distribution of the light source is expanded and irradiated. Therefore, when the light emission luminance distribution of the light source is made analogous to the shape of the incident opening of the multiplex reflection element 23, the best efficiency can be obtained. That is, the light emission luminance distribution of the light source is made most effective, when it is made substantially analogous to the effective region of the image display element 26.

Figure 4:
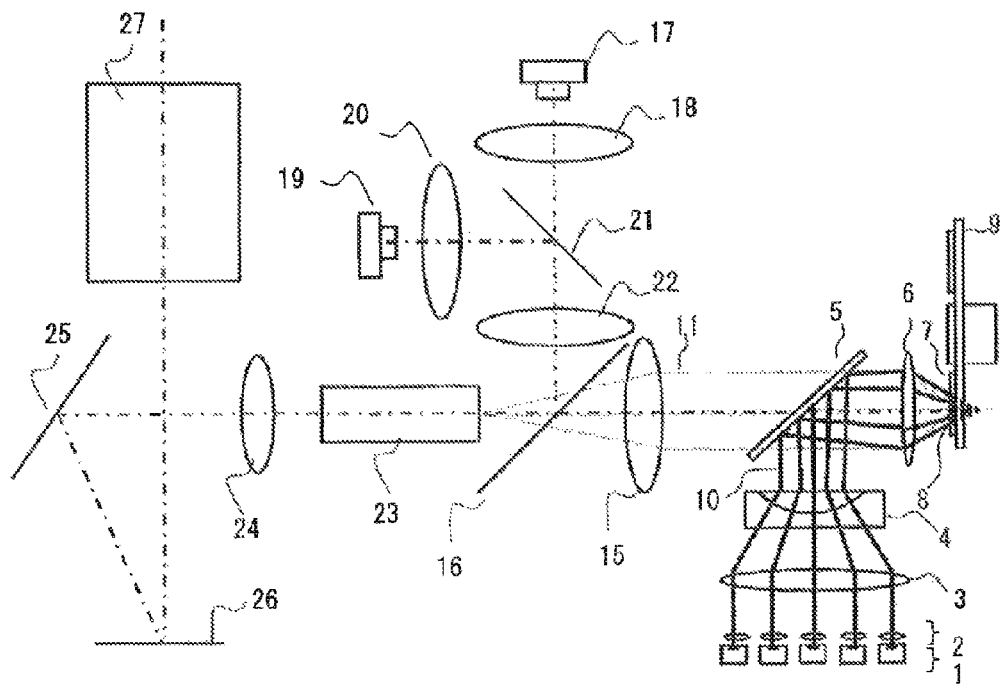
FIG. 4 is a diagram showing an optical system of a projection-type image display device that uses the light source device of the first embodiment.
Figure 4:
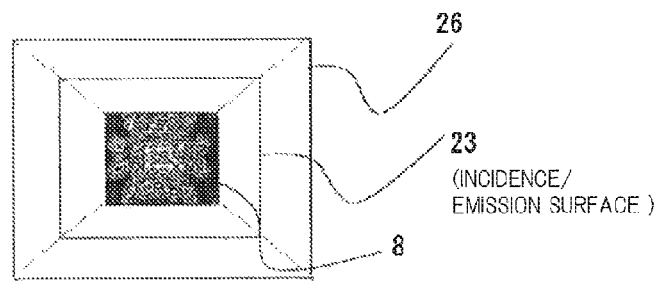

FIG. 4 is a diagram showing a configuration of the projection-type image display device that uses the light source device of the first embodiment, which differs from that shown in FIG. 3.

A main difference between FIG. 3(A) and FIG. 4(A) lies in that the characteristics of the dichroic mirror 5 and the layout of the condenser lens 6 and the disc 9 differ from each other. In this case, the dichroic mirror 5 has such characteristics as to reflect blue light and pass green light therethrough. The blue light is reflected by the dichroic mirror 5 and after having been changed to green light by the fluorescent material 7, the green light passes through the dichroic mirror 5, and then made incident on the condenser lens 15. The processes thereafter are the same as those in FIG. 3(A). In FIG. 4(B) also, the same luminance distribution as that of FIG. 4 (A) is obtained. Additionally, in FIG. 3 and FIG. 4, explanations have been given by using the light source device of the first embodiment; however, the light source device of the second embodiment may be used.

Figure 5:
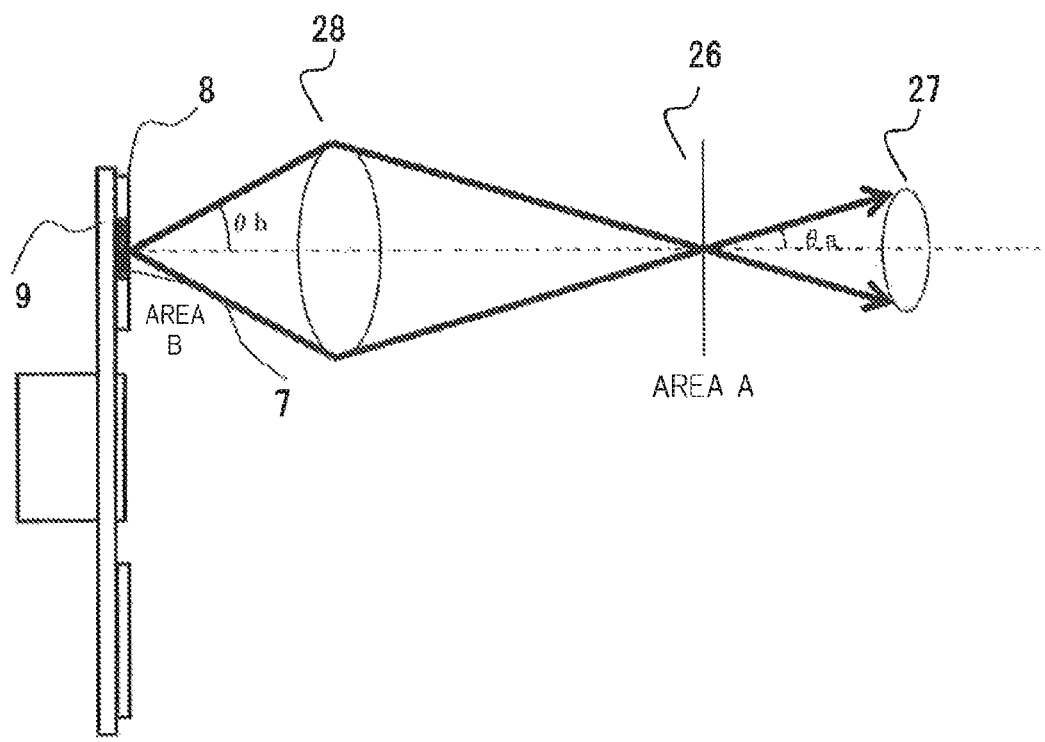
FIG. 5 is an explanatory view illustrating "etendue".

Next, an optimal light emitting area of the light source will be described. FIG. 5 is an explanatory view illustrating "etendue". Fluorescent light emitted from the irradiation region 8 is expanded and irradiated onto the image display element 26 by the optical member 28. Although the optical member 28 is generally composed of a plurality of optical members, it is substituted for a single lens in this case.

Light emitted from the image display element 26 is enlarged and projected onto a screen from the projection lens 27. The luminance of the projection from the projection lens is determined by a product (illumination etendue) between the area of the image display element and a solid angle obtained by an F value that is a brightness parameter of the projection lens. Since the illumination etendue has such characteristics as to be preserved, the product (light source etendue) of the light emission area that is determined on the light source side and the light-ray solid angle is not set to be higher than the illumination etendue. Therefore, as the light emission area of the light source becomes larger, a light-ray diffusing angle that can be captured by the illumination optical system is reduced, with the result that the illumination efficiency is lowered.

Supposing that the area of the image display element 26 is A, the area of the irradiation region 8 of excitation light is B, the light-ray capturing half angle determined by the F value of the projection lens 27 is θa and the light-ray diffusing angle of a fluorescent light ray emitted from the irradiation region 8 is θb, a solid angle determined by the F value of the projection lens 27 is represented by 2π(1−cos θa) and a light ray solid angle of the fluorescent light emitted from the irradiation region 8 of the excitation light is represented by 2π(1−cos θb); thus, the following formula (1) is substantially satisfied.

$$A \times 2\pi(1-\cos \theta a) \approx B \times 2\pi(1-\cos \theta b) \quad \text{(Formula 1)}$$

The fluorescent light diffused from the irradiation region 8 is diffused in all directions; however, since it is reflected by the substrate of the disc 9, the light ray solid angle of the fluorescent light becomes 2π. Therefore, (Formula 1) can be replaced by (Formula 2).

$$A \times 2\pi(1-\cos \theta a) \approx B \times 2\pi \quad \text{(Formula 2)}$$

Moreover, with respect to the F value of the projection lens 27 and the light ray diffusing angle θa, (Formula 3) is satisfied.

$$\tan \theta a = 1/(2 \times F) \quad \text{(Formula 3)}$$

From (Formula 2) and (Formula 3), (Formula 4) is substantially satisfied.

$$B \approx A \times (1-\cos(\arctan(1/(2 \times F)))) \quad \text{(Formula 4)}$$

Since the F value of the projection lens of the projection-type image display device is generally set to 1.5 to 3.0, a range indicated by (Formula 5) can be selected from (Formula 4) as the area B of the irradiation region 8 of excitation light.

$$0.0136 \times A \leq B \leq 0.0513 \times A \quad \text{(Formula 5)}$$

Furthermore, since the luminance distribution in the irradiation region 8 has a predetermined expansion, it is difficult to clearly determine the region. Therefore, the irradiation region 8 is defined as a region up to where $1/e^2$ (≈13.5%) of the luminance peak is satisfied.

In the above-mentioned embodiment, the explanations have been given by supposing that the green light is fluorescent light excited by the excitation light source, and that the blue light and red light are LED lights; however, other variations may also be proposed. For example, the red light is LED light, with the green light and blue light being prepared as fluorescent light, or the blue light is LED light, with the green light and red light being prepared as fluorescent light, or all the red light, green light and blue light are prepared as fluorescent light, etc.

Moreover, the explanations have been given by exemplifying a configuration in which the fluorescent material 7 is rotated. This configuration is used because an organic silicon resin or the like is used as a binder for diffusing the fluorescent material to be solidified, so that burning due to temperatures needs to be prevented. However, the fluorescent material needs not be rotated, as long as the service life of the fluorescent material is ensured by using, for example, an inorganic binder.

Moreover, the explanations have been given on the assumption that a plurality of excitation light sources and optical fibers are present; however, only one of them may be used. Furthermore, the explanations have been given on the assumption that a DMD (Digital Micromirror Device) element is used as an image display element; however, a liquid crystal-type image display element may be used.

EXPLANATION OF REFERENCE NUMERALS

1 . . . group of excitation light sources, 2 . . . group of collimate lenses, 3 . . . convex lens, 4 . . . concave lens, 5 . . . dichroic mirror, 6 . . . condenser lens, 7 . . . fluorescent material, 8 . . . excitation light irradiation region, 9 . . . disc, 10 . . . excitation light, 11 . . . fluorescent light, 12 . . . group of condenser lenses, 13 . . . group of optical fibers

The invention claimed is:

1. A light source device comprising:
an excitation light source for emitting excitation light;
a fluorescent material for emitting fluorescent light when excited by the excitation light; and
an optical member for directing the excitation light to the fluorescent material,
wherein the optical member has a curvature that is set so as to allow the excitation light that has passed through the optical member to be made incident on the fluorescent material at a front side of the fluorescent material as a light-condensing position, and
wherein supposing that an area of the luminance distribution of the excitation light irradiated onto the fluorescent material is B and that an area of the image display element is A, the following formula is satisfied: 0.0136×A≤B≤0.0513×A.

2. The light source device according to claim 1, further comprising:
a dichroic mirror disposed between the excitation light source and the fluorescent material,
wherein the optical member is a condenser lens disposed between the fluorescent material and the dichroic mirror.

3. The light source device according to claim 1,
wherein the excitation light irradiated onto the fluorescent material has a luminance distribution that is substantially analogous to the image display element.

4. The light source device according to claim 1, further comprising an optical fiber for directing the excitation light to the fluorescent material.

5. The light source device according to claim 1, further comprising:
a dichroic mirror disposed between the excitation light source and the fluorescent material; and
a condenser lens for condensing the excitation light disposed between the fluorescent material and the dichroic mirror,
wherein the optical member is disposed between the excitation light source and the dichroic mirror.

6. The light source device according to claim 5,
wherein the optical member is a convex lens and a concave lens, with the convex lens and the concave lens being disposed in this order from the excitation light source toward the dichroic mirror.

7. The light source device according to claim 6,
wherein at least either one of the convex lens and the concave lens has a curvature that is set so as to allow the excitation light to be made incident on the fluorescent material at a front side of the fluorescent material as a light-condensing position.

8. A projection-type image display device comprising:
a light source device;
an image display element;
an illumination optical system having a plurality of optical elements for irradiating the image display element with light from the light source device; and
a projection lens for enlarging an optical image formed by the image display element to project the resulting image,
wherein the light source device includes:
an excitation light source for emitting excitation light;
a fluorescent material for emitting fluorescent light when excited by the excitation light; and
an optical member for directing the excitation light to the fluorescent material, and
the optical member has a curvature that is set such that a light-condensing position of the excitation light is positioned on an emission side of the excitation light relative to the fluorescent material,
a dichroic mirror disposed between the excitation light source and the fluorescent material; and
a condenser lens for condensing the excitation light disposed between the fluorescent material and the dichroic mirror,
wherein the optical member is disposed between the excitation light source and the dichroic mirror, and
wherein the optical member is a convex lens and a concave lens, with the convex lens and the concave lens being disposed in this order from the excitation light source toward the dichroic mirror.

9. The projection-type image display device according to claim 8, further comprising an optical fiber for directing the excitation light to the fluorescent material.

10. The projection-type image display device according to claim 8,
wherein at least either one of the convex lens and the concave lens has a curvature that is set so as to allow the excitation light to be made incident on the fluorescent material at a front side of the fluorescent material as a light-condensing position.

11. The projection-type image display device according to claim 8, further comprising:
a dichroic mirror disposed between the excitation light source and the fluorescent material,
wherein the optical member is a condenser lens disposed between the fluorescent material and the dichroic mirror.

12. The projection-type image display device according to claim 8,
wherein the excitation light irradiated onto the fluorescent material has a luminance distribution that is substantially analogous to the image display element.

\* \* \* \* \*